(12) United States Patent
Friedli

(10) Patent No.: US 11,049,346 B2
(45) Date of Patent: Jun. 29, 2021

(54) VISITOR ACCESS CONTROL SYSTEM WITH RADIO IDENTIFICATION AND FACIAL RECOGNITION

(71) Applicant: INVENTIO AG, Hergiswil (CH)

(72) Inventor: Paul Friedli, Remetschwil (CH)

(73) Assignee: Inventio AG

( * ) Notice: Subject to any disclaimer, the term of this patent is extended or adjusted under 35 U.S.C. 154(b) by 0 days.

(21) Appl. No.: 16/603,943

(22) PCT Filed: Mar. 28, 2018

(86) PCT No.: PCT/EP2018/057972
§ 371 (c)(1),
(2) Date: Oct. 9, 2019

(87) PCT Pub. No.: WO2018/188957
PCT Pub. Date: Oct. 18, 2018

(65) Prior Publication Data
US 2020/0126338 A1  Apr. 23, 2020

(30) Foreign Application Priority Data
Apr. 10, 2017 (EP) .................................. 17165817

(51) Int. Cl.
*G07C 9/25* (2020.01)
*G06K 9/00* (2006.01)

(52) U.S. Cl.
CPC ......... *G07C 9/253* (2020.01); *G06K 9/00295* (2013.01); *G06K 9/00926* (2013.01)

(58) Field of Classification Search
CPC . G07C 9/253; G07C 9/29; G07C 9/27; G07C 9/257; G07C 9/00904;
(Continued)

(56) References Cited

U.S. PATENT DOCUMENTS 6,971,029 B1  11/2005 Avery, IV et al.
9,619,965 B1 *  4/2017 Hill ...................... G07F 17/3209
(Continued)

FOREIGN PATENT DOCUMENTS

CN  105654584 A  6/2016
CN  106296920 A  1/2017
(Continued)

OTHER PUBLICATIONS

"Gesichtserkennung" ["Facial Recognition"] German Federal Office for Information Security, retrieved from https://www.bsi.bund.de/DE/Themen/DigitaleGesellschaft/Biometrie/BiometrischeVe on Jan. 27, 2017, 20 Pages [with machine translation and hand annotated drawings].

*Primary Examiner* — Xuemei G Chen
(74) *Attorney, Agent, or Firm* — Bressler, Amery and Ross; Pierre R. Yanney

(57) ABSTRACT

In an access control system, a registration procedure for a visitor is implemented to control access to an access-restricted zone in a building or a site. At the invitation of a host, the visitor sends a digital image, an invitation identification number and a device-specific identifier of the electronic device of the visitor to the access control system. The image data and the identifier are assigned to a visitor profile previously created for the visitor by means of the identification number of the invitation. The image data are processed by the access control system to generate a reference template, the reference template being stored in the visitor profile.

16 Claims, 3 Drawing Sheets

(58) Field of Classification Search
CPC ............ G07C 9/00563; G07C 2209/02; G06K 9/00295; G06K 9/00926
See application file for complete search history.

(56) References Cited

U.S. PATENT DOCUMENTS

| | | | |
|---|---|---|---|
| 9,641,510 B2* | 5/2017 | Shen | G07C 9/00174 |
| 10,121,058 B2* | 11/2018 | Askari | G06F 16/51 |
| 10,158,550 B2* | 12/2018 | Trani | G07C 9/28 |
| 10,163,288 B2* | 12/2018 | Troesch | G07C 9/00309 |
| 10,198,625 B1* | 2/2019 | Shin | G06K 9/00255 |
| 10,223,696 B2* | 3/2019 | Chen | G06Q 20/40145 |
| 10,306,411 B2* | 5/2019 | Finschi | H04W 4/33 |
| 10,614,436 B1* | 4/2020 | Sharma | G06F 16/51 |
| 2007/0103548 A1* | 5/2007 | Carter | H04N 7/185 |
| | | | 348/143 |
| 2007/0198286 A1* | 8/2007 | Tomita | G06F 21/32 |
| | | | 713/182 |
| 2007/0198850 A1* | 8/2007 | Martin | G07C 9/257 |
| | | | 713/186 |
| 2007/0273474 A1 | 11/2007 | Levine | |
| 2009/0104934 A1* | 4/2009 | Jeong | H04N 1/00161 |
| | | | 455/556.1 |
| 2013/0292467 A1 | 11/2013 | Avs et al. | |
| 2014/0365782 A1* | 12/2014 | Beatson | G06F 21/32 |
| | | | 713/186 |
| 2015/0221151 A1* | 8/2015 | Bacco | G06K 9/00771 |
| | | | 340/5.83 |
| 2016/0019547 A1* | 1/2016 | Gurnani | G06Q 20/40145 |
| | | | 705/44 |
| 2016/0308859 A1 | 10/2016 | Barry et al. | |
| 2016/0364927 A1 | 12/2016 | Barry et al. | |
| 2017/0142581 A1* | 5/2017 | Tarmey | G07C 9/00563 |
| 2017/0148241 A1* | 5/2017 | Kerning | G08B 27/006 |
| 2017/0221288 A1* | 8/2017 | Johnson | G07C 9/257 |
| 2017/0255941 A1* | 9/2017 | Chandrasekaran | |
| | | | G06Q 20/40145 |
| 2017/0264608 A1* | 9/2017 | Moore | H04W 12/06 |
| 2018/0165516 A1* | 6/2018 | Furst | G06K 9/00288 |
| 2018/0322268 A1* | 11/2018 | Grammer | G07C 9/28 |
| 2019/0172281 A1* | 6/2019 | Einberg | G06K 9/00255 |
| 2019/0258496 A1* | 8/2019 | Vinton | H04L 43/0817 |
| 2019/0327227 A1* | 10/2019 | Tobkes | H04W 12/06 |

FOREIGN PATENT DOCUMENTS

| | | |
|---|---|---|
| CN | 106373233 A | 2/2017 |
| CN | 105654584 B | 5/2018 |
| EP | 2051486 A2 | 4/2009 |
| EP | 2677465 A1 | 12/2013 |

* cited by examiner

VISITOR ACCESS CONTROL SYSTEM WITH RADIO IDENTIFICATION AND FACIAL RECOGNITION

CROSS-REFERENCE TO RELATED APPLICATIONS

This application is the national phase application under 35 U.S.C. § 371 claiming the benefit of priority based on International Patent Application No. PCT/EP2018/057972, filed on Mar. 28, 2018, which claims the benefit of priority based on European Patent Application No. 17165817.2, filed on Apr. 10, 2017. The contents of each of these applications are herein incorporated by reference.

FIELD OF THE INVENTION

The technology described herein generally relates to an access control system that grants an authorized user access to an access-restricted zone in a building or site. Exemplary embodiments of the technology relate, in particular, to an access control system for visitors and to a method for operating such an access control system.

BACKGROUND OF THE INVENTION

Access control systems may be designed in a variety of different ways. For example, U.S. Pat. No. 9,077,716 describes an access control system, in which a mobile electronic device communicates with an electronic door lock by means of a Bluetooth or WLAN radio link, and with a web server by means of a WAN (Wide Area Network) radio link to open the electronic lock. For this purpose, the mobile electronic device sends its device identifier and a user-entered identifier of the electronic lock to the web server, which checks the access authorization and sends a response to the mobile device consisting of a lock command, the lock identifier and a code pattern. The mobile device sends the lock command and the code pattern to the electronic lock. The lock is opened if it recognizes the lock command and the code pattern as valid.

WO 2010/112586 A1 describes an access control system, in which a mobile telephone carried by a user sends an identification code to an access node. If the identification code is recognized as valid, the access node sends an access code to the mobile phone, which displays the access node on a display. If the user holds the mobile phone to a camera so that it can detect the displayed access code, the access control system checks whether the detected access code is valid. If the code is valid, access will be granted to the user.

These access control systems provide a degree of user-friendliness, because users do not carry authorization credentials or conventional keys and do not need to remember an access code. Instead, the mobile electronic device, which many users already carry for communication purposes anyway, provides the function of an authorization credential or key. Despite the use of mobile devices, these access control systems require users to handle the mobile devices. There is therefore a need for a different, even more user-friendly technology.

SUMMARY OF THE INVENTION

One aspect of such technology relates to a method of operating an access control system to control access to an access-restricted zone in a building or site, the method including a visitor registration process. The access control system comprises a transmitting and receiving device for communicating with a visitor's mobile electronic device by means of a radio link, a memory device, a processor and an image processing device. According to the registration method, invitation data generated and sent by an electronic host system are received by the access control system, the invitation data including an invitation identification number and an appointed time when a host expects a visitor in the access-restricted zone. A visitor profile assigned to the invitation is created in the memory device and the invitation data are stored in the visitor profile, the memory device containing a database which is provided for storing user profiles of access-authorized users and visitors. The access control system receives image data of the visitor, the invitation's identification number, and a device-specific identifier of the visitor's electronic device. The image data and the identifier are stored in the memory device, the image data and the identifier being assigned to the visitor profile by means of the identification number of the invitation. The image data are processed by the access control system to generate a reference template, the reference template being stored in the visitor profile.

Another aspect relates to an access control system for controlling access to an access-restricted zone in a building or site, the access control system comprising a transmitting and receiving device for communicating with a visitor's mobile electronic device by means of a radio link, a memory device, a processor and an image processing device. During operation, the processor controls receipt by the access control system of invitation data generated and sent by an electronic host system, the invitation data including an invitation identification number and an appointed time when a host expects a visitor in the access-restricted zone. The processor also controls creation of a visitor profile assigned to the invitation in the memory device and controls storage of the invitation data in the visitor profile. The memory device contains a database, which is provided for storing user profiles of access-authorized users and visitors. The processor also controls reception by the access control system of image data of the visitor, the invitation's identification number, and a device-specific identifier of the visitor's electronic device. The processor also controls storing the image data and the identifier in the memory device, the image data and the identifier being assigned to the visitor profile by means of the identification number of the invitation, processing the image data via the image processing device to generate a reference template, and storing the reference template in the visitor profile.

The technology described herein allows for a registration of a visitor so that the visitor may be granted access to an access-restricted zone in the same manner by the access control system, as a user who lives or works in the building. Thus, no special precautions must be taken in the building for visitors, for example, no people or only a few people are required for receiving visitors.

In one exemplary embodiment, the validity of a visitor registration is limited in time, for example, for the duration of a visit. Afterwards the registration may be deactivated or deleted. In another exemplary embodiment, the registration may be indefinite, for example, if the visitor desires access to the access-restricted zone multiple times over a longer period of time. A deactivated registration may be reactivated with updated invitation data at a later point in time for a re-visit of the visitor. A transmission of an image may then be omitted.

In the access control system, a time window may be established for an invitation, which defines a time period before and/or after a time of day specified in the appointment, within which the visitor is to be granted access. The visitor may be informed of these time windows in the invitation. This reduces the risk of potential disruptions that may arise if the visitor arrives late or too early.

The technology described herein provides flexibility as to the manner in which the image data, the invitation's identification number, and the access control system identifier are received. In one exemplary embodiment, these data are received over a communication channel, which is specified in the invitation generated by the host system. An Internet address of a web portal is specified in one exemplary embodiment as a communication channel. In another exemplary embodiment, an e-mail address or a telephone number of a building management is specified as the communication channel.

Once the visitor's registration is completed, an access control procedure may be carried out if the visitor desires access according to the invitation. The access control method comprises receiving via the transmitting and receiving device, a device-specific identifier, which is sent from the mobile electronic device of the visitor or of another visitor when the mobile electronic device is located in a public zone within the radio range of the transmitting and receiving device. The received identifier of the mobile electronic device is stored in the memory device as belonging to a user or visitor present. The method also comprises generating a real time template for facial features of the user or visitor present from a camera image of the user present produced by a camera of the image processing device when the user present desires access to the access-restricted zone. By means of the stored identifier of the mobile electronic device, it is determined whether the received identifier of the mobile electronic device is assigned to a reference template in the database. If such an assignment exists, the image processing device checks to see if the real-time template matches this reference template to a specified degree. If there is a match, the system grants the user or visitor access to the access-restricted zone and denies access in the case of a mismatch.

The technology described herein provides an access control system that does not require user manipulation of the mobile electronic device, especially not when the user is already at or near the access (for example, a door). A first phase of checking whether the user is access-authorized already takes place when the user is still relatively far away from access. For example, the user may be moving in the direction of access to the access-restricted zone during which, in one exemplary embodiment, the user's mobile electronic device is or has already been in communication with the transmitting and receiving device of the access control system. The transmitting and receiving device in this case receives the identifier of the mobile electronic device, which, if the user is registered as access-authorized, is assigned to a stored user profile. If the user then enters a detection area of a camera of the access control system, facial features of the user are ascertained from a digital camera image in a second phase. If the ascertained facial features match facial features stored in a user profile to a specified degree, the user is access-authorized and access is granted without the user having to manipulate the mobile electronic device. An authorized user is thus able to enter the access-restricted zone almost seamlessly.

A large number of users (for example, several hundred or thousand) may be authorized access to an access-restricted zone in a building or area; user profiles are created according to this number. Nevertheless, the technology described herein offers the advantage that the check for a match is carried out quickly, because not all user profiles of the access-authorized users need to be checked for a match, but only the user profiles of the users actually present. A user present is thus able to enter the access-restricted zone without significant interruption or delay. This reduces the risk, especially in the case of heavy traffic volume, of a queue forming in front of the access.

Not only does the technology provide a faster check, it may also be used in the case of high security demands because, for example, an authentication is carried out twice. On the one hand, two different channels are used: Radio for the transmission of an identifier and optical detection of a user's face. The identifier must belong to a registered user in the system, and the evaluation of the facial parameters must indicate a registered user. On the other hand, fewer user profiles need to be searched or checked, which reduces the frequency of errors (i.e., an access-authorized user is mistakenly denied access or a user who is not access-authorized is erroneously granted access).

Depending on traffic volume, a plurality of mobile electronic devices may be located in the public zone. In such a situation, the transmitting and receiving device receives a plurality of identifiers that are stored in the memory device, and for each stored identifier it is ascertained whether the received identifier is assigned to a reference template in the database. If such assignments exist, it is checked whether the real-time template matches one of these reference templates; if there is a match, the system grants the user access to the access-restricted zone and, in the event of a mismatch, denies access to the user. The aforementioned advantage of the quick check is therefore also ensured in the case of high traffic volume, since the check for a match is restricted to a limited set of user profiles.

On the one hand, the technology described herein limits the check for a match to a limited set of user profiles. On the other hand, this limited set comprises only access-authorized users, because it is only in the case of an access-authorized user that the identifier of the mobile device is assigned to a stored user profile. For the image processing device, this means that relatively minimal demands are placed on an image processing algorithm implemented therein, for example, with respect to recognition accuracy. Compared to an image processing algorithm, the task of which is to identify a person with a high recognition accuracy based on a relatively high number of facial features (i.e., the degree of match must be relatively high, for example, greater than 90%), it is sufficient for the technology described herein to assign relatively few facial features to one of the access-authorized users. In addition, the degree of match may be set at between approximately 60% and approximately 90%, for example. A low cost image processing algorithm may therefore be used; however, the safety requirements may nevertheless be ensured.

In one exemplary embodiment, checking for a match includes generating a result signal. If there is a match, it indicates that the user has access to the access-restricted zone, whereas in the case of a mismatch, it indicates that the user does not have access to the access-restricted zone. In one exemplary embodiment, a control signal may be generated as a function of the result signal, in order to release or to block a (physical) barrier (for example, barrier, door, or turnstile). In another exemplary embodiment, the control signal activates an information device in the case of an access denial. The information device may be used, for example, in connection with an access without a physical barrier. If an unauthorized user is recognized at the access, the information device in one case may generate an alarm, which is perceptible at the access (acoustically and/or visually). In another case, the control signal may alert a security service, which then checks the user who has been recognized as not access-authorized.

In one exemplary embodiment, the radio connection takes place between the transmitting and receiving device and a mobile electronic device of a user in accordance with a Bluetooth standard or a WLAN/WiFi standard. This is advantageous, because commercially available mobile phones or smartphones are already equipped with Bluetooth technology, and thus no special devices are needed.

The technology described herein also allows for flexibility in terms of the identifier of a mobile device. The identifier of a mobile device may comprise, for example, a device identification number permanently assigned to the device or a telephone number assigned to the mobile device. In one exemplary embodiment, each mobile device is equipped with application-specific software that generates a unique and time-invariable identifier for the mobile device. The identifier (whether it includes a device identification number or a telephone number or is generated by software) enables the clear identification of a mobile device.

In one exemplary embodiment, the image processing device has a modular structure; an image processing module generates the real-time template from a camera image, and an evaluation module connected to the image processing module and the memory device generates a result signal indicating whether the real-time template matches this reference template. Such a modularity allows an efficient adaptation of the modules to different requirements (for example, implementation of a cost-effective image processing algorithm in the evaluation module).

In the technology described herein, it is an advantage that its application is not limited to the manner in which access to the access-restricted zone is designed. The access may comprise a physical barrier, for example, a barrier, a door, a revolving door or a turnstile, which is either released or remains blocked. Alternatively, the access may be designed without such a physical barrier (i.e., as an essentially barrier-free access). If an unauthorized user is detected at the access (with or without a physical barrier) using the technology described herein, an alarm may be generated and/or a security service may be alerted.

In one exemplary embodiment, the technology described herein may be used in conjunction with an elevator system. For example, a destination floor may be specified for each access-authorized user, on which, for example, the user's workplace or apartment is located. With each grant of access, a destination call may be generated for the user in question, whereupon an elevator control of the elevator system moves an elevator car first to a boarding floor and then to a destination floor. This enhances the user-friendliness because the user is able to directly approach an assigned elevator car without having to input an elevator call themselves.

BRIEF DESCRIPTION OF THE DRAWINGS

Various aspects of the improved technology are described in greater detail below with reference to exemplary embodiments in conjunction with the drawings. In the figures, identical elements have identical reference numerals. In the figures.

DETAILED DESCRIPTION OF EMBODIMENTS OF THE INVENTION

Figure 1:
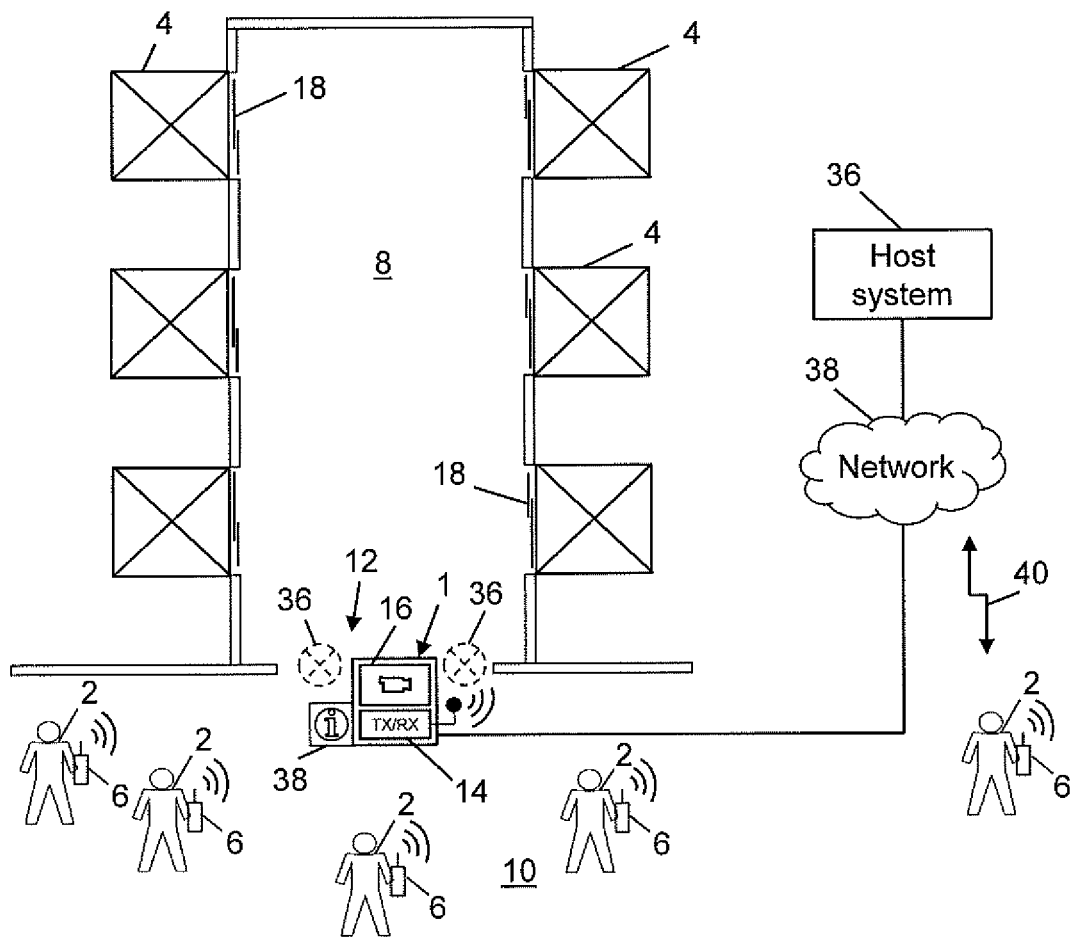
FIG. 1 shows a schematic representation of an application example of an access control system in connection with a building.

FIG. 1 is a schematic representation of an application example of an access control system 1 in connection with a situation in a building, of which, for purposes of illustration, only a few walls, rooms 4 and zones 8, 10 are shown. The rooms 4 may be, for example, offices, apartments, halls and/or elevator cars of an elevator system. In the application of the access control system 1 shown in FIG. 1, multiple users 2 carrying mobile electronic devices 6 (also referred to below as mobile device 6) are located in the zone 10. Zone 10 is not subject to access restriction in this example and is also referred to below as public zone 10. The public zone 10 may be an area inside or outside the building. An access 12 separates the public zone 10 from the zone 8, which is subject to an access restriction and adjoins the rooms 4. Those skilled in the art will recognize that the access control system 1 is not limited to applications within a building, but may be used in an analogous manner to also control access to an access-restricted zone on a site. The term "building" in this description is understood to mean, for example, residential buildings, commercial buildings, sports arenas, shopping centers, but also ships.

The access control system 1 monitors the access 12 so that only authorized users 2 are able to enter the zone 8, for example, by blocking or releasing a door, a barrier, a turnstile, or other physical barrier, via activation of an information device 38 in the case of access without a physical barrier, if an unauthorized user 2 is recognized, or via a combination of these measures. The information device 38 may, for example, trigger a visual and/or audible alarm or initiate a notification of a security service. For purposes of illustration, the access control system 1 is delineated in FIG. 1 as being situated in the access 12; in addition, a turnstile 36 is indicated as an exemplary physical barrier. However, those skilled in the art will recognize that in a specific implementation, the access control system 1 or its components may be arranged in different ways.

In another exemplary embodiment, the access control system 1 is situated at an access 18 to at least one room 4, possibly at each access 18. Depending on the nature of the room 4, the access 18 comprises, for example, an office door, a story door, an apartment door or an elevator door, each of which then represents a physical barrier. In this exemplary embodiment, each room 4 corresponds to an access-restricted zone 8, and the area in front of an access 18 corresponds to the public zone 10. The access control system 1 unlocks, for example, an electronic lock of an office door or apartment door. In an elevator-related application, the access control system 1 may, for example, prevent the departure of an elevator car when an unauthorized user 2 enters or wishes to enter the car.

Figure 2:
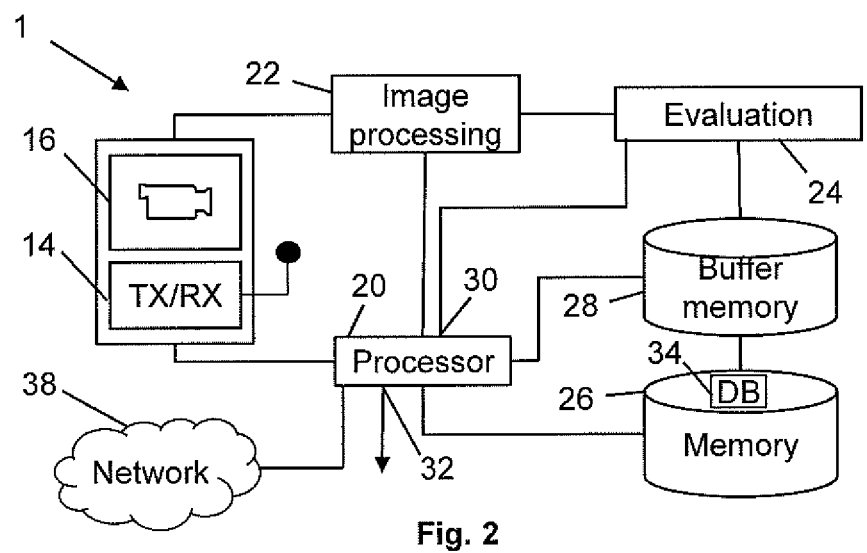
FIG. 2 shows a schematic representation of an exemplary embodiment of an access control system.

As indicated in FIG. 1, the access control system 1 comprises a transmitting and receiving device 14 (illustrated as TX/RX in FIG. 1) and a camera 16 as part of an image processing device; additional components of the access control system 1 are shown in FIG. 2. In one exemplary embodiment described herein, the transmitting and receiving device is designed to receive radio signals, and is therefore also referred to below as transceiver 14. The transceiver 14 communicates with the mobile electronic devices 6 when they are located within radio range of the transceiver 14, i.e., a radio signal emitted by a mobile device 6 has a signal strength at the location of the transceiver 14 (expressed by an RSSI value (Received Signal Strength Indicator)), which is greater than a threshold value specified for safe reception. The communication takes place, for example, via a near-field radio network such as, for example, a Bluetooth radio network, WLAN/WiFi or a ZigBee radio network. Bluetooth is a standard in accordance with IEEE 802.15.1, WLAN/WiFi is a standard in accordance with IEEE 802.11, and Zig-Bee is a standard in accordance with IEEE 802.15.4. Such radio networks in accordance with these standards are used for the wireless networking of devices over a short distance of approximately a few meters to approximately one hundred meters. The radio network forms the interface via which the mobile electronic device 6 and the transceiver 14 are able to communicate with each other.

In another exemplary embodiment, the transmitting and receiving device 14 is communicatively coupled to a communication network 38. The transmitting and receiving device 14 in this exemplary embodiment is able to receive the device-specific identifier of a mobile device 6 via the communication network 38. The mobile device 6 is able to determine its current location by means of a positioning function installed thereon, for example, based on GPS (Global Positioning System). The mobile device 6 is able to transmit the location, together with its identifier, to the transmitting and receiving device 14 by means of an Internet connection (including the communication network 38) formed via a mobile radio system (for example, 4G) and possibly an application-specific software.

Exemplary embodiments of the technology are described below with reference to the transceiver 14. As described above, the transceiver 14 receives an identifier transmitted from a mobile electronic device 6 by means of a (near-field) radio communication.

The camera 16 produces a camera image of a user 2 (in particular, the user's face), which is located in the detection area of the camera 16, when the user 2 wishes to enter the access-restricted zone 8 at the access 12. In one exemplary embodiment, the camera 16 produces a digital camera image (also referred to as a digital image). The transceiver 14 and the camera 16 (including other components of the image processing device) may be situated in a housing, which is situated, for example, in the access 12 as shown in FIG. 1. Alternatively, the transceiver 14 and the camera 16 (including other components of the image processing device) may also be situated separately from one another as separate units, for example, spatially separated from one another in an area around the access 12, the camera 16 to be situated so that essentially only the one user 2 is detected, who actually desires access.

In the situation shown in FIG. 1, the technology described herein may be advantageously used to operate the access control system 1 with as little complexity as possible, and to grant the user 2 convenient access to the access-restricted zone 8. Summarized briefly and by way of example, the access control system 1 according to one exemplary embodiment is operated as follows: Once a user 2 is within radio range of the transceiver 14, his/her mobile device 6 automatically communicates with the transceiver 14 and the mobile device 6 sends its identifier to the transceiver 14. In the situation according to FIG. 1, the transceiver 14 receives a plurality of identifiers. The access system 1 therefore "knows" how many mobile devices 6 are located within radio range at a particular point in time and, if their users 2 are registered users 2, to which users 2 the mobile devices 6 belong. These users 2 may be combined to form a group of users 2 present. If one of the users 2 present now wishes to access the access-restricted zone 8, the access control system 1 ascertains a dataset with facial features of this user 2 as part of an image processing and of a facial recognition process and compares this ascertained dataset with stored (facial feature) datasets assigned to the users 2 present. This comparison is therefore limited to the group of users 2 present; thus, only datasets of this group are searched to see whether the ascertained dataset matches one of the stored datasets. The facial recognition process is quicker, since not all datasets created in the access control system 1 need to be searched, and it can be decided more quickly whether the user 2 is access-authorized or not.

FIG. 1 also shows the communication network 38, which in one exemplary embodiment is communicatively connected to a host system 36 and to the access control system 1. It is also indicated that a user 2 may communicate via the communication network 38 by means of a communication link 40, for example, with the host system 36 or with a web portal. Exemplary functions of the communication network 38 and of the host system 36 are described in connection with FIG. 4.

FIG. 2 shows a schematic illustration of one exemplary embodiment of the access control system 1. In one exemplary embodiment, the access control system 1 has a modular structure and comprises an image processing device which, in addition to the camera 16, comprises an image processing module 22 (image processing in FIG. 2) and an evaluation module 24 (evaluation in FIG. 2). In addition to the transceiver 14, the access control system 1 also comprises a processor 20, a memory device 26 (memory in FIG. 2), and a buffer device 28 (buffer in FIG. 2). Those skilled in the art will recognize that at least one of the memory devices 26, 28 may also be assigned to the image processing device, or that the function of the buffer device 28 may be performed by the memory device 26, and thus the buffer device 28 may be omitted in one exemplary embodiment. The processor 20 has an output 32 for a control signal and an input 30 for a result signal generated by the evaluation module 24. As a function of the result signal, the processor 20 controls the access control system 1 so that the user 2 is granted or denied access. If, for example, a physical barrier (for example, turnstile 36 in FIG. 1) separates the zones 8, 10, the control signal releases or blocks the barrier. On the other hand, if the zone separation occurs without a physical barrier, in the case of an unauthorized user 2, the control signal activates, for example, the information device 38 to generate an alarm or alert a security service. The information device 38 may also be activated to indicate to the user 2 or to a security service in connection with a barrier, that the barrier has been released or blocked.

The camera 16 in one exemplary embodiment comprises a digital camera having selectable and/or adjustable properties; camera images are thus present in this exemplary embodiment as digital datasets. The properties of the digital camera, for example, resolution (for example, indicated in megapixels), exposure and focal length, are selected or set so that a camera image (digital image) may be evaluated and the user's face 2 may be recognized in evaluable quality on the digital image. A digital image is, for example, in the JPEG format, but it may also be in a different format, for example, in the BMP format or in the JPEG2000 format. The camera 16 may be equipped with a sensor module or may be connected to a separate sensor module, which activates the camera 16 when it detects the presence of a user 2 in the detection area of the camera 16. The sensor module may comprise, for example, a proximity sensor, which may be designed as an ultrasonic sensor, an infrared sensor or an optical sensor (for example, light barrier, brightness sensor). Alternatively, the presence of a user 2 in the detection area of the camera 16 may be recognized in one exemplary embodiment as a result of changes detected in the detection area. If, for example, the user 2 enters the detection area and the camera 16 is always in an active state, the camera 16 records changes in front of an essentially static background; these changes are interpreted as presence.

The evaluation module 24 is shown for purposes of illustration as a separate unit, which is connected to the image processing module 22, to the processor 20 and to the buffer device 28. In one exemplary embodiment, the evaluation module 24 and the image processing module form a unit. The memory devices 26, 28 are also shown as separate units for purposes of illustration; depending on the design, they may be combined to form one memory device, where they occupy, for example, separate memory areas. Irrespective of the above, the memory devices 26, 28 may comprise, for example, a hard disk drive (HDD) or CD/DVD drive, a semiconductor drive/solid state disk (SSD), or combinations thereof, or other digital data memory devices for digital data.

The aforementioned unit made up of evaluation module 24 and image processing module 22 comprises at least one processor unit, which executes a computer-aided method for image processing. Image processing methods are known, for example from U.S. Pat. No. 8,494,231 B2. A basic representation of the image processing for the purpose of facial recognition is described in the publication "Gesichtserkennung" ["Facial Recognition"] of the German Federal Office for Information Security (available under the topic of biometrics at the Internet address www.bsi.bund.de). This publication distinguishes between the three main steps "Create template", "Create reference dataset" and "Compare facial images". In order to make the comparison of two facial images as simple and quick as possible, the features of a face are ascertained and stored in the form of a feature dataset referred to as a "template". When the face on an image of a user has been found and standardized, features in addition to the eyes, nose, and mouth/chin are sought, measured, and related to each other. These extracted features are encoded, compressed, and stored as a feature dataset (template). The similarity of the templates of two facial images are defined by combining them using a mathematical algorithm. This results in a degree of similarity of the templates. If the result is within certain tolerance limits, the two templates, and thus their underlying facial images, are classified as identical.

According to the technology described herein, a template is generated for each user 2 when registering as an access-authorized user and stored in a user profile of the user 2. The template may be generated from a digital image showing the face of user 2. This template is referred to below as a reference template. It is advantageous if, during the registration, the user's face 2 is exposed to lighting conditions similar to those on-site in the vicinity of the camera 16. This facilitates the comparison of templates, i.e., the comparison of the reference template with a real-time template, which is generated when a user 2 requests access to the access-restricted zone 8.

In the situation shown in FIG. 1, several users 2 are lingering in the public zone 10; some may desire access to the access-restricted zone 8, some may be coming from zone 8 on the way to a building exit, and others, in turn, may be on their way to another part of the building. This means in the situation shown that not every user 2 lingering in the public zone 10 actually wishes to enter the zone 8. From the perspective of the access control system 1, however, all users 2 present are potential users 2, who may sooner or later desire access.

The access control system 1 ascertains the users 2 present with the aid of the communication between the mobile devices 6 and the transceiver 14. In each mobile device 6, a radio module, for example a Bluetooth module, is activated in order to be able to communicate with the transceiver 14 as soon as it is located within radio range of the transceiver 14. Depending on the design of the mobile device 6 and its radio module, an application-specific software application (also referred to as an app) may also be activated. The application specific software application is used in one exemplary embodiment in connection with the access control and with the use of elevators. In one exemplary embodiment, the application specific software also generates a unique and time-invariable identifier for the mobile device. Such a software-generated identifier represents an alternative to the above-mentioned device identification number and to a telephone number.

During communication, the mobile device 6 sends its identifier to the transceiver 14; the access control system 1 thus updates a database, in which the identifiers of all mobile devices 6 currently present are stored. These may be mobile devices 6, whose users 2 are registered as access-authorized users 2 in the access control system 1, as well as mobile devices 6, whose users 2 are not registered. In one exemplary embodiment, the database storing the identities of the users 2 present is located in the buffer 28.

For each registered user 2, a user profile is created in the access control system 1, i.e., it is stored as a dataset in a database 34. The database 34 in one exemplary embodiment is set up in the memory device 26. The user profile includes personal data of the user 2 (for example, name, reason for authorization (resident, employee, external service provider) and facial features in the form of a template), access authorizations (for example, specific rooms 4 and floors) and possibly temporal access restrictions (for example, access from Monday to Friday, from 7:00 am to 8:00 pm). In the user profile, the user 2 is also assigned at least one mobile device 6. As an alternative to creating the user profile in the access control system 1, the user profile may be created in a database of a building management system, wherein the access control system 1 may access this database by means of a communication network.

If one of the users 2 present desires access to the access-restricted zone 8, this user will be moving in the public zone 10, for example, coming from a building main entrance, in the direction of the access 12. If the user 2 arrives in a detection area of the camera 16 situated there, the camera 16 produces one or multiple digital images or a video recording, each of which is available as a digital dataset and is stored temporarily for further processing. The image processing module 22 ascertains the real-time template from the dataset, as discussed elsewhere in this description.

If the real-time template has been ascertained, the evaluation module 24 starts a search algorithm in order to check whether the ascertained real-time template may be assigned to a registered user 2. Instead of searching all stored user profiles in the memory device 26, the search algorithm searches only the user profiles of the users 2 present. The group of users 2 present is stored in the buffer 28 as described above. If the ascertained facial features match the facial features stored in the user profile of the user 2 to a specified degree, the evaluation module 24 generates a result signal, which indicates that the user 2 is access-authorized. If, on the other hand, there is no such match, the result signal generated by the evaluation module 24 indicates that the user 2 is not access-authorized.

The mobile device 6 may be, for example, a mobile phone, a smartphone, a tablet PC or a smartwatch, these devices usually being equipped with hardware that enables communication via a near-field radio network. However, the mobile device 6 may also be miniature computer goggles or another body-worn computer-aided device (also referred to as a "wearable device") when these devices are intended for near field communication. Depending on the design of the mobile device 6, it may, for example, have a graphical user interface (also referred to as Graphical User Interface, GUI) in order to be able to selectively activate and deactivate the mobile device 6 and its functions.

With the understanding of the basic system components and their functionalities described above, a description of an exemplary access control method is provided below in connection with FIG. 3 as one aspect of a method of operating the access control system 1 (another aspect is a registration method described in connection with FIG. 4 for a visitor). The description is made with reference to a user 2 who desires to enter the access-restricted zone 8 at the entrance 12, for example, to use an elevator there. The user 2 is carrying the mobile device 2 and has activated the radio module (for example, for Bluetooth communication) and possibly an associated software application. The method begins with a step S1 and ends with a step S10.

If the user 2 is located with their mobile device 6 in the public zone 10 and within the radio range of the transceiver 14, the transceiver 14 receives in a step S2 an identifier emitted by the mobile device 6. The transceiver 14 and the mobile device 6 communicate in accordance with the same communication standard, in this exemplary embodiment via a Bluetooth radio link. The received identifier is stored in a step S3; for example, in the buffer device 28.

Steps S2 and S3 are executed for each mobile device 6 that is located within radio range of the transceiver 14, and that operates in accordance with the same communication standard as the transceiver 14. Depending on the number of users 2 in the public zone 10, a plurality of identifiers, corresponding to a group of users 2 present, may be stored in the buffer device 28 at a particular point in time. Those skilled in the art will recognize that the buffer device 28 is updated when a mobile device 6 is no longer within radio range, for example, because the associated user 2 has left the public zone 10 without desiring access to the access-restricted zone 8 or because the associated user 2 has already entered the access-restricted zone 8. The buffer device 28 thus stores the identifiers of the mobile devices 6, whose users 2 are present in the public zone 10 at a particular point in time.

In a step S4 it is ascertained whether one of the users 2 present desires access to the access-restricted zone 8. The access control system 1 recognizes this desire according to one exemplary embodiment with the aid of the aforementioned sensor module or with the aid of the detection of background changes. For example, the sensor module detects when the user 2 enters the detection area of the camera 16, whereupon the camera 16 is activated. If a desire for access is recognized, the process proceeds along the Yes branch to a step S5. Otherwise, the process remains in a loop along the No branch.

In step S5, the activated camera 16 produces a digital image, which reproduces at least the face of the detected user 2, and the image processing module generates a real-time template from the digital image, as discussed elsewhere in this description.

In a step S6, each user profile assigned to a received identifier is searched in the database 34 by means of the real-time template ascertained in step S5. A user profile is only searched if it is assigned to a user 2 present based on a received identifier. If a registered user 2 requests access, a user profile exists in the database 34 for this user 2, in which the identifier of the mobile device 6 is stored. If the user 2 requesting access is not a registered user 2, the identifier of the mobile device 6 is not assigned a user profile.

When searching according to step S6, it is checked in a step S7 whether the real-time template matches a reference template to a specified degree. In one exemplary embodiment, the real-time template and the reference templates each comprise a specified number of specified facial parameters and their values (for example, eye distance, mouth width, distance between lip top edge and lip bottom edge, distance between nose and lip bottom edge, etc.). During the search, the parameter values of the real-time template are compared with the parameter values of the reference templates. There is a match when the degree of similarity of the templates is at least equal to the specified degree. The specified degree indicates a percentage match of the facial parameters of the real-time template with the facial parameters of a reference template. Depending on the accuracy requirement, the specified degree may be selected, for example, to be between approximately 60% and approximately 90%.

If there is a match, the process advances along the Yes branch to a step S9 in which the user 2 is granted access. If, on the other hand, there is no match, the process advances along the No branch to a step S8 and the user 2 is denied access.

Figure 3:
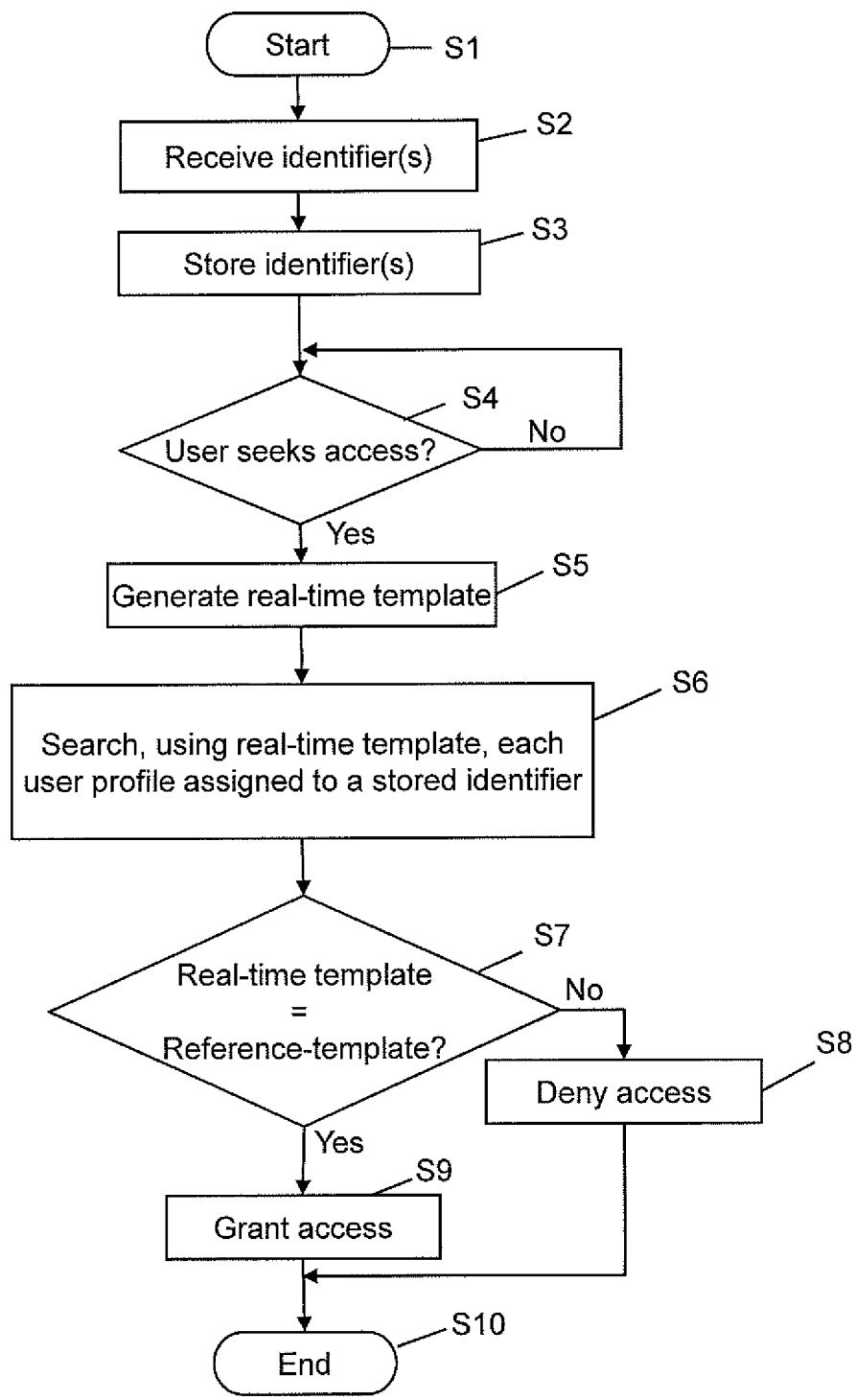
FIG. 3 shows a flow chart of an exemplary embodiment of an access control method as one aspect of a method for operating the access control system.
Figure 4:
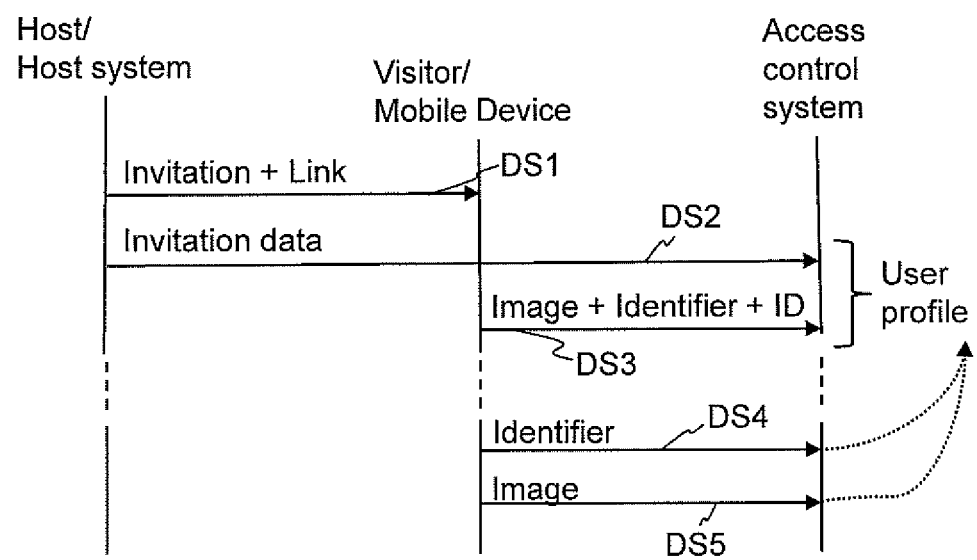
FIG. 4 shows an exemplary signal diagram for illustrating an exemplary embodiment of a visitor registration method as one aspect of a method for operating the access control system.

From the description of an exemplary method for operating the access control system 1 provided in connection with FIG. 3, it is apparent that a user 2 does not have to manipulate their mobile device 6 in order to gain access to the access-restricted zone 8. Depending on the design of the access, i.e., with or without a physical barrier, the control of the access authorization may take place without the user 2 taking notice.

In one exemplary embodiment, the access control system 1 is connected to an elevator system, in particular, to an elevator controller. The communication between the access control system 1 and the elevator control may take place via the network 38. For example, if the access control takes place in the entrance hall of the building through which users 2 must pass in order to access the elevators, a destination call may be initiated with each access granted to the user 2 in question. The elevator control of the elevator system processes the destination call and assigns it an elevator. The elevator assigned to the destination call may be displayed to the user 2, for example, by a terminal at the access 12 and/or may be communicated by voice. The user 2 may thus go directly to the assigned elevator without having to enter an elevator call.

In the description provided in conjunction with FIG. 3, each user 2 in the access control system number 1 is registered as an access-authorized user 2. Depending on the type of building, unregistered users 2, for example, visitors, may also desire access to the access-restricted zone 8. FIG. 4 shows a signal diagram of one exemplary embodiment of a method which makes it possible to conveniently grant visitors access to the access-restricted zone 8. In order to illustrate an exemplary scenario, FIG. 4 schematically shows interactions between a host or a host system 36 used by the host, a visitor or the visitor's mobile device 6, and the access control system 1, in order to register the visitor in the control system 1 by means of a registration process. Thus, according to the technology described herein, the visitor is also a user 2 (reference numeral 2 will be used hereinafter for both the visitor and for one or multiple users).

In this scenario, the host and visitor 2 agree on an appointed time, i.e., a date and time or period of time when the host expects visitor 2. The host then generates an invitation, for example, with the host system (for example, PC, notebook, tablet PC, smartphone or with another electronic device) and a software application installed thereon (for example, with the aid of Outlook or similar application programs) and sends it to the visitor 2, for example, via the communication network 38 and the communication link 40. The communication link 40 may be established, for example, via a mobile radio communication system.

In addition to the appointment details, the invitation comprises an identification number assigned to the invitation (referred to as "ID" in FIG. 4) and also information about a communication channel which the visitor 2 has to use for communication with the access control system 1 for the purpose of registration. In one exemplary embodiment, the communication channel is the Internet; the communication channel information therefore includes an Internet address for a web portal (referred to as "link" in FIG. 4). For example, the Internet address may include a Uniform Resource Locator (URL) that identifies and localizes the Web portal as a resource regarding the access method to be used (for example, a used network protocol such as HTTP or FTP) and the location of the resource on a computer network. The web portal is assigned to a computer system of the access control system 1. The transmission of the invitation takes place in one exemplary embodiment via the communication network 38 by means of a signal DS1; it may be done, for example, as a text message to the mobile device 6 of the visitor 2 or as an e-mail to the e-mail address of the visitor 2.

The host or host system 36 also sends the data of the invitation by means of a signal DS2 to the access control system 1, for example, via the communication network 38 and for sending the invitation essentially simultaneously or at a later point in time. The access control system 1, controlled by the control data processor 20, creates a visitor profile for the received invitation. In addition to the appointment information, the invitation data in one exemplary embodiment also include information about the host, for example, name, telephone number, floor and/or apartment number or office number. In addition, a time window may be specified, within which the visitor 2 is to be granted access. The time window may indicate, for example, that the visitor 2 has access approximately half an hour before and after the beginning of the appointment, in case the visitor 2 arrives too early or is delayed. The visitor profile may be deleted after the arrival of the visitor 2 or at a later point in time.

The invitation invites the visitor 2 to send a digital image, on which the face of the visitor 2 may be seen, to the access control system 1 via the specified communication channel, for example, comprising the web portal. For example, the visitor 2 may take a current self-portrait (also known as a "selfie") with the camera of his mobile device 6 and upload it via the web portal. In another embodiment, the visitor 2 may also upload a stored digital image recorded at an earlier point in time. One advantage of the technology described herein is that the visitor 2 may upload the digital image at a point in time chosen by them, as long as it is before the appointment. The visitor 2 in this case may be geographically far away from the building or located already in or near the building.

In connection with the uploading of the digital image, a transmission of the identification number of the invitation also takes place, so that the access control system 1 may assign the received digital image explicitly to the invitation. Depending on the design, the visitor may be invited to input the identifier of the mobile device 6 (for example, telephone number or device identification number). If the visitor uploads the digital image by means of the mobile device 6, the identifier of the mobile device 6 in one exemplary embodiment is also transmitted, for example, automatically, to the access control system 1. An application-specific software application, if it is installed on the mobile device 6 as described above, assists the visitor 2 in uploading the digital image. The digital image, the identifier and the identification number of the invitation are transmitted by means of a signal DS3, for example, via the communication network 38 and the communication link 40. The signal DS3 may be transmitted in accordance with a known transmission protocol, for example, TCP (Transmission Control Protocol), IP (Internet Protocol) and UDP (User Data Protocol). The access control system 1 stores the received data (digital image, identifier and identification number of the invitation) in the visitor profile.

The technology described herein may also utilize other communication channels. As an alternative to utilizing a web portal, the invitation may invite the visitor 2 to transmit the digital image, the identifier, and the identification number of the invitation to a building management. The building management may manage, for example, for the building in question, the database 34 in which the user profiles of the access-authorized users 2 are stored. The transmission to the building management may take place, for example, to an e-mail address specified in the invitation of the building management or telephone number of the building management, for example, for an SMS or MMS message. Building management personnel may then initiate the further processing of the received data.

In one exemplary embodiment, the processor 20 shown in FIG. 2 controls the reception and further processing of the digital image, the identifier, and the identification number of the invitation. The access control system 1 generates a reference template with the aid of the image processing device 22 from the digital image of the visitor 2, as described in connection with FIG. 2, and stores the reference template in the visitor profile. Thus, according to one embodiment, the visitor profile is complete for the purpose of access control, and the registration process by which the visitor 2 is registered in the access control system 1 is completed. The reference template and the invitation data may be read by accessing the visitor profile, for example, by means of the identifier of the mobile device 6 of the visitor 2.

After the visitor profile has been created, the visitor 2 may be granted access in accordance with the access control procedure described in connection with FIG. 3 if the visitor appears in the building at the agreed time. As soon as the visitor arrives in the public zone 10 in the reception area of the transceiver 14, the transceiver 14 receives the identifier emitted by the mobile device 6. The identifier of the mobile device 6 is received as described above and is represented in FIG. 4 by means of a signal DS4. When the visitor subsequently enters the detection area of the camera 16, the camera 16 produces a digital image showing the visitor's face. The production of the digital image by the camera 16 and the subsequent generation of a real-time template take place as described above; in FIG. 4 this is represented by a signal DS 5.

The access control system 1 checks whether the real-time template matches the reference template to the specified degree. The access control system 1 also checks whether the visitor requests access within the time window specified in the visitor profile. If both conditions are met, the visitor is granted access.

In one exemplary embodiment, the access control system 1 generates and sends a message to the host informing the host that the visitor has been granted access. The host may thus promptly prepare for the appearance of the visitor.

Depending on the design of the building, the access control system 1 may communicate with an elevator control in order to generate a destination call for the visitor 2 when the access is granted. The elevator controller assigns an elevator to the destination call, whereby the assigned elevator may be communicated to the visitor 2 in the area of the access 12 by display or voice. The assigned elevator transports the visitor 2 to the floor where the host is located. The host's floor is stored, for example, in the visitor profile in connection with the invitation data. The visitor 2, especially if they are in the building for the first time, therefore need not deal with the input of the destination floor. The visitor 2 may also be provided more information to better orient themselves in the building, for example, the visitor 2 may be advised in which direction (possibly also how far) they should go after getting off at the floor. The notification of such routing information may be done, for example, by means of the mobile device 6 of the visitor 2 and/or displays on the floors or in the elevator car.

The invention claimed is:

1. A method for operating an access control system for controlling access to an access-restricted zone in a building or a site and registering a visitor, the access control system comprising a transmitting and receiving device, a memory device, a processor and an image processing device, said method comprising:
   receiving, by the access control system, invitation data generated and transmitted by an electronic host system, the invitation data comprising an invitation's identification number and an appointed time when a host expects a visitor in the access-restricted zone;
   creating, in the memory device, a visitor profile assigned to the invitation, and storing the invitation data in the visitor profile, the memory device having a database for storing user profiles of access-authorized users and visitors;
   receiving by the access control system, image data of the visitor, the invitation's identification number, and a device-specific identifier of an electronic device of the visitor;
   storing, in the memory device, the image data and the identifier, the image data and the identifier being assigned to the visitor profile by means of the invitation's identification number;
   processing, by the access control system, the image data to generate a reference template; and
   saving, in the visitor profile, the reference template.

2. The method of claim 1, wherein the image data, the invitation's identification number, and the identifier are received over a communication channel, which is specified in the invitation generated by the host system.

3. The method of claim 2, wherein an Internet address of a web portal is specified as a communication channel.

4. The method of claim 2, wherein an e-mail address or a telephone number of a building management is specified as the communication channel.

5. The method of claim 1, further comprising:
   defining a time window, which defines a time period before and/or after a time specified in the appointment, within which the visitor is granted access.

6. The method of claim 1, wherein the method comprises an access control method, the access control method comprising:
   receiving a device-specific identifier of a mobile electronic device via the transmitting and receiving device when the mobile electronic device is located in a public zone from which a user or the visitor may request access to the access-restricted zone;
   storing the received identifier of the mobile electronic device in the memory device as belonging to a user or visitor present;
   generating a real-time template for facial features of a present user or visitor from a camera image of the present user or visitor produced by a camera of the image processing device, if a presence of the present user or visitor is recognized in a detection area of the camera when the present user or visitor desires access to the access-restricted zone, the real-time template being generated by the image processing device; and
   searching user profiles stored in the database for a reference template that matches the real-time template to a specified degree, a user profile being searched only if it is assigned to a present user or visitor based on a received identifier, in case of a match, the access control system granting the user or visitor access to the access-restricted zone and denying access when there is no match.

7. The method of claim 6, wherein when a plurality of mobile electronic devices are located in the public zone:
   a plurality of received identifiers are stored in the memory device,
   for each stored identifier, it is ascertained whether in the database the received identifier is assigned to a reference template; and,
   if an assignment exists, checking to see whether the real-time template matches a reference template to a specified degree, in the case of a match, the access control system granting the user or the visitor access to the access-restricted zone and denying access when there is no match.

8. The method of claim 6, wherein the searching further comprises generating a result signal, which indicates, in the case of a match, that the user or visitor has access to the access-restricted zone and, when there is no match, indicates that the user or visitor has no access to the access-restricted zone.

9. The method of claim 8, further comprising:
   generating a control signal as a function of the result signal, in order to release a barrier.

10. The method of claim 8, further comprising:
    generating a control signal as a function of the result signal, in order to activate an information device if access is denied.

11. The method of claim 6, wherein the transmitting and receiving device communicates with a mobile electronic device by means of a radio link, the radio link between the transmitting and receiving device and the mobile electronic device of the user or visitor taking place in accordance with a Bluetooth standard or a WLAN/WiFi standard, and the transmitting and receiving device receiving the device-specific identifier via the radio link when the mobile electronic device is located within radio range of the transmitting and receiving device.

12. The method of claim 6, wherein the transmitting and receiving device receives the device-specific identifier by means of a communication network.

13. The method of claim 6, wherein the real-time template and the reference template each comprise a specified number of specified facial parameters, and in which the specified degree is between approximately 60% and 90%, the specified degree indicating a percentage match of the facial parameters of the real-time template with the facial parameters of a reference template.

14. The method of claim 1, wherein the identifier is generated by an application-specific software, which is active on the electronic device, the identifier being time-invariable.

15. The method of claim 1, wherein the identifier comprises a device identification number or a telephone number assigned to the electronic device.

16. An access control system for controlling access to an access-restricted zone in a building or a site, the access control system comprising a transmitting and receiving device for communicating with a mobile electronic device of a visitor by means of a radio link, a memory device, a processor and an image processing device, wherein, during operation, the processor:
controls receipt by the access control system of invitation data generated and transmitted by an electronic host system, the invitation data comprising an invitation identification number and an appointed time when a host expects a visitor in the access-restricted zone;
controls creation of a visitor profile assigned to the invitation in the memory device and a storing of the invitation data in the visitor profile, the memory device containing a database provided for storing user profiles of access-authorized users and visitors;
controls receipt by the access control system of image data of the visitor, the invitation's identification number and a device-specific identifier of the electronic device of the visitor;
controls storage of the image data and the identifier in the memory device, the image data and the identifier being assigned to the visitor profile by means of the identification number of the invitation;
controls processing of the image data by the image processing device to generate a reference template; and
controls storing of the reference template in the visitor profile.

* * * * *